Figure 1:
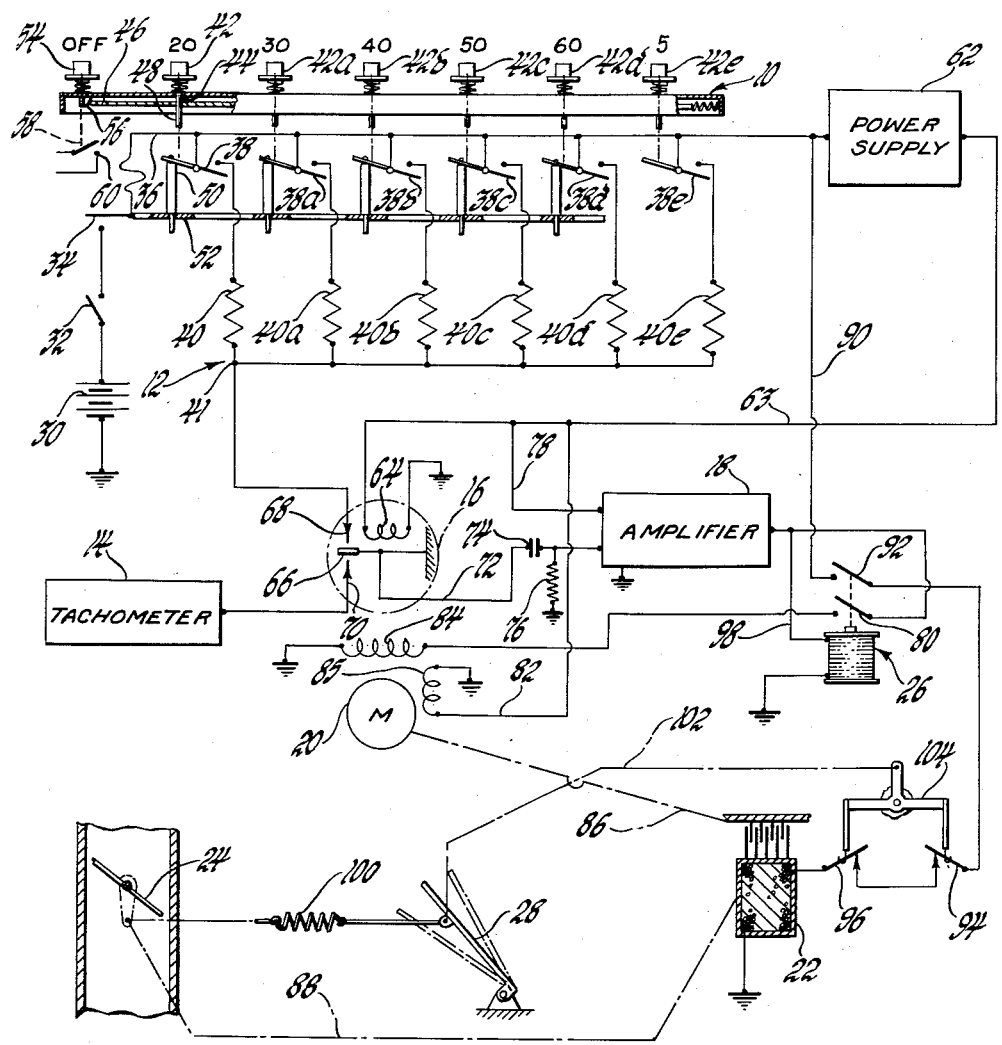

Feb. 14, 1961 H. M. DAVIS ET AL 2,971,596

VEHICLE SPEED CONTROL SYSTEM

Filed Nov. 29, 1957

INVENTORS
Harry M. Davis &
BY Reino O. Karell

E. W. Christen

ATTORNEY

United States Patent Office 2,971,596
Patented Feb. 14, 1961

2,971,596

VEHICLE SPEED CONTROL SYSTEM

Harry M. Davis and Reino O. Karell, Milwaukee, Wis., assignors to General Motors Corporation, Detroit, Mich., a corporation of Delaware Filed Nov. 29, 1957, Ser. No. 699,739

6 Claims. (Cl. 180—82.1)

This invention relates to speed control systems and more particularly to such systems for self-propelled vehicles.

In the present-day scheme of vehicle traffic, it is desirable under many conditions to maintain uniform vehicle speed without requiring the driver to devote continuous attention and effort to this factor of vehicle operation. In accordance with this invention, there is provided a vehicle speed control system which automatically maintains a given speed selected by the driver. This is accomplished by utilizing a control system of the feedback type wherein signal quantities corresponding to the desired speed and the actual speed are continuously combined to produce a control signal quantity for controlling the vehicle speed accordingly. Additionally, it is desired to provide automatic control within a control range of limited extent relative to the desired speed so that the driver may control the speed at will until the automatic control range is reached and then be relieved of continuous control effort. This is accomplished by providing the control system with means responsive to the disagreement between the actual and desired speed values for disabling the control system when this difference exceeds a predetermined value. In order to facilitate selection by the driver of the desired vehicle speed and to continuously apprise him of the selected speed, a manual selector in the form of a pushbutton mechanism is provided. The selector mechanism constitutes the actuator for a reference signal generator which develops a reference voltage corresponding to the desired speed of the vehicle by means of a voltage divider arrangement.

Such a speed control system must not in any way impair the safety of vehicle operation and therefore the required control and reaction of the driver should be consistent with previously acquired driving habits. Furthermore, the driver must be enabled to completely override the automatic control system to cope with any emergency situation in the same manner as he would in the absence of the speed control system. Accordingly, manual override is provided by the usual operation of the throttle control to cause vehicle acceleration and deceleration from the selected speed. For this purpose, the automatic control system includes a relay actuated clutch which may be disengaged by displacement of the throttle control or accelerator pedal to either of its extreme positions.

Figure 2:
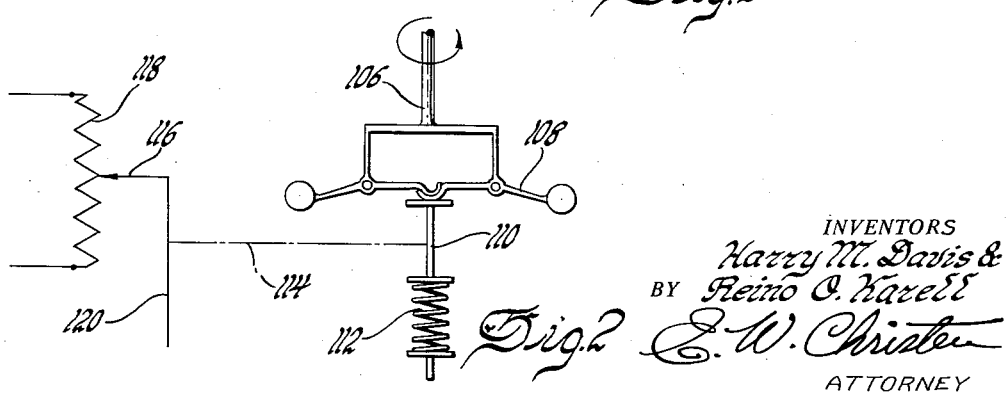

A more complete understanding of this invention may be had from the detailed description which follows taken with the accompanying drawings in which:

Figure 1 is a diagrammatic representation of the inventive speed control system; and Figure 2 is a modification of one component in the system of Figure 1.

Referring now to the drawings, there is shown an illustrative embodiment of the invention in a speed control system for an automotive vehicle having a conventional internal combustion engine as the motive power means with conventional throttle control. In general, the control system comprises a speed selector mechanism 10 for actuating a reference signal generator 12 which develops a voltage corresponding to the desired vehicle speed. A speed signal generator or tachometer 14 develops a voltage corresponding to actual speed of the vehicle and the signal voltages thus developed are applied through a combining means or converter 16 and a phase sensitive amplifier 18 for developing a control voltage corresponding to the difference between the actual and desired vehicle speeds. The amplifier is adapted to energize a reversible servomotor 20 which is mechanically coupled through a relay actuated clutch 22 to the engine speed controller or throttle valve 24. In order to establish an automatic control range for the control system there is provided a relay 26 responsive to the difference between the signal voltages for disabling the servomotor when the difference exceeds a predetermined value. A throttle control or accelerator pedal 28 is provided for manual control of the throttle valve 24.

The reference signal generator 12 comprises a source of direct voltage or battery 30 having one terminal connected to a point of reference potential or ground and the other terminal connected through the vehicle ignition switch 32 and an on-off switch 34 to a supply voltage conductor 36. For selection of a desired speed, voltage divider means including plural selector switches are provided. A selector switch 38 has its movable contact connected to the supply voltage conductor 36 and its fixed contact connected through resistor 40 to the common terminal 41. Similarly, the selector switches 38a, 38b, 38c, 38d and 38e are connected in parallel from the supply voltage conductor 36 through the corresponding resistors 40a, 40b, 40c, 40d, and 40e to the common terminal 41. The actuation of the selector switches is provided by the push-button selector mechanism 10 including the speed selector push-buttons 42, 42a, 42b, 42c, 42d, and 42e. The push-button 42 includes a push rod 48 which is spring biased in its outward position and may be manually depressed to close the selector switch 38. The push rod 48 extends through the latch bar 46 and includes a cam 44 coacting therewith. When the push-button 42 is depressed the latch bar 46 is shifted laterally by the action of the cam 44 against the resistance of a coil spring and the movable contact of switch 38 is caused to pivot about its central supporting fulcrum. The movable contact of switch 38 is provided with a depending push rod 50 having a reduced end portion extending in slidable relation through the pivotable plate 52. Each of the other push-buttons 42a, 42b, 42c, and 42d are constructed in the same manner as push-button 42 and coact with the respective selector switches in the same manner. It is thus apparent that depression of any one of the push-buttons 42a, 42b, 42c, and 42d causes the closure of the corresponding selector switch and the opening of each of the other selector switches. At the same time the pivotable plate 52 is displaced to close the on-off switch 34. The push-button 42e operates independently of the remaining push-buttons and may be actuated to close the selector switch 38e in combination with any of the other selector switches. The on-off switch 34 is actuable by the push-button 54 which is provided with a cam 56 adapted to engage the latch bar 46 and shift the same laterally to release all of the push-buttons. The push-button 54 also includes an operating shaft 58 connected for actuation of an auxiliary switch 60. This auxiliary switch is suitably connected in circuit with the engine starting motor to prevent starting of the vehicle engine unless the speed control system is turned off.

The resistors 40, 40a, 40b, 40c, and 40d are graduated in value to provide an output voltage from the reference signal generator 12 which is proportional to the desired speed as indicated by the corresponding push-button. The push-buttons of the selector mechanism are suitably calibrated in terms of miles per hour in such manner that push-button 42 corresponds to 20 miles per hour, push-button 42a corresponds to 30 miles per hour and so on. The resistor 40e is of such value that it provides a voltage increment corresponding to a speed increment equal to one-half the difference between adjacent push-buttons. The reference signal generator 12 develops an output voltage at the common terminal 41 corresponding to the desired speed which is applied to the combining means 16 to be described presently.

The speed signal generator or tachometer 14 suitably takes the form of a conventional direct current tachometer generator for developing a voltage corresponding to the actual speed of the vehicle. It is connected in any suitable manner to the driving wheels or propeller shaft of the vehicle for rotation therewith.

The reference signal voltage and the speed signal voltage are applied to the combining means or converter 16 for developing a control voltage corresponding in amplitude and phase to the difference between the signal voltages and hence, to the difference between the actual and desired speeds of the vehicle. The converter 16 suitably takes the form of a conventional chopper or vibrator. For energization of the converter and other components with an alternating voltage of reference frequency and phase, there is provided a power supply 62 which, in turn, is energized from the supply voltage conductor 36. The energizing winding 64 of the converter 16 is connected across the power supply 62 through conductor 63 for maintaining oscillation of its vibratory contact 66 at the reference frequency. The reference signal voltage from the generator 12 is connected to the fixed contact 68 of the converter 16 and the speed signal voltage from the generator 14 is connected to the fixed contact 70. The circuits of the reference and speed signal generators are alternately completed through the vibratory contact 66 and conductor 72 through the direct current blocking condenser 74 and resistor 76 to ground. Thus an alternating control voltage of the reference frequency and having an amplitude and phase corresponding to the difference between the reference voltage and speed voltage is developed across the resistor 76.

The control voltage thus derived is applied to the input terminals of the phase sensitive servo amplifier 18 which is energized with voltage of the reference phase through the supply voltage conductor 63 and conductor 78. The amplifier 18 develops an output voltage corresponding in amplitude and phase to the difference between the reference and speed signal voltages and the output terminals thereof are connected through the relay actuated switch 80 across the variable phase energizing winding 84 of the reversible servomotor 20. The fixed or reference phase winding 85 of the servomotor 20 is energized from the power supply 62 through the supply voltage conductor 63 and conductor 82. The servomotor 20 has its output shaft 86 coupled with the driven element of the relay actuated clutch 22 which has the driving element coupled through the linkage 88 with the lever arm of the throttle valve 24.

In order to provide a control range for the automatic speed control system, means are provided to respond to the difference between the desired speed and the actual speed of the vehicle and to disable the control system until the difference becomes less than a predetermined value. Accordingly, the relay actuated clutch 22 is energized from the supply voltage conductor 36 through the conductor 90, through the relay actuated switch 92 of the voltage sensitive relay 26; the clutch circuit is then completed through limit switches 94 and 96 to the energizing winding of the clutch and thence to ground. The relay 26 is adapted to actuate the switches 80 and 92 and has its energizing winding connected across the output terminals of the amplifier 18 through the conductor 98. The sensitivity of the relay 26 is selected so that it will maintain the switches 80 and 92 open when the speed difference, as represented by the amplifier output voltage, is greater than a predetermined value, for example, that corresponding to a speed difference of 5 miles per hour. In this condition, the power supply to the relay actuated clutch is interrupted by switch 92 and similarly the control voltage from the amplifier 18 to the reversible phase winding 84 of motor 20 is interrupted by the switch 80 and the control system is disabled. However, when the predetermined speed difference is attained, the relay 26 is actuated and the switches 80 and 92 are closed to provide fully automatic control of vehicle speed.

Conventional manual control of the throttle valve 24 is provided by the throttle control or accelerator pedal 28 which is connected with the lever arm of the throttle valve 24 through a linkage including a resilient element or coil spring 100. This coil spring permits the servomotor 20, through the clutch 22, to displace the throttle valve 24 without positive displacement of the accelerator pedal 28 and thus precise positioning of the pedal by the driver is unnecessary. To provide manual override of the automatic control system, the accelerator pedal 28 is connected through the mechanical linkage 102 to the limit switch actuator 104 connected with the limit switches 94 and 96. This interconnection is adapted to open the limit switch 94 when the accelerator pedal 28 is fully depressed and to open limit switch 96 when the accelerator pedal is fully released. Since the limit switches 94 and 96 are in series connection between the power supply conductor 36 and the energizing coil of clutch 22, the movement of accelerator pedal 28 to either extreme position causes deenergization of the clutch which disables the automatic control system and restores manual control of the throttle valve 24.

In Figure 2 is shown an alternative embodiment of the speed signal generator which may be substituted for the tachometer generator 14. It comprises a flyball governor 106 having its input shaft rotatably driven at a speed proportional to the vehicle speed by any suitable connection with the driving wheels or propeller shaft. The flyball elements 108 act through the displacement element 110 against the reaction of bias spring 112 to produce a linear displacement proportional to rotative speed. The displacement element 112 is connected through a suitable linkage 114 to the movable contact 116 of a potentiometer 118. The potentiometer is excited with a constant voltage from a source, not shown, and thus the voltage developed on the movable contact 116 is proportional to the vehicle speed and is applied through conductor 120 to the fixed contact 70 of the converter 16.

The inventive control system will be further understood from a consideration of a typical sequence of operation. Prior to starting the vehicle engine, the driver will depress the off push-button 54 to displace the latch bar 46 which releases the other push-buttons and opens the corresponding selector switches 38, 38a, etc. which may have been closed and also opens the on-off switch 34. The off push-button 54 will also close the auxiliary switch 60 in the circuit of the engine starting motor thus permitting the vehicle engine to be started. With the ignition switch 32 closed and the vehicle engine running, the driver may select the speed at which he desires to cruise by depressing the appropriate speed selector push-buttons. For example, if the desired speed is 45 miles per hour, the driver will depress push-button 42b, corresponding to 40 miles per hour, which closes the selector switch 38b and the on-off switch 34. The driver will also depress the push-button 42e to add the 5 mile per hour increment of speed, thus closing the selector switch 38e. Accordingly, the resistors 40b and 40e are connected in parallel as voltage divider resistors across the battery 30 and a voltage is developed at the fixed contact 68 of converter 16 corresponding to the desired speed of 45 miles per hour. With the vehicle at a standstill the speed signal voltage from the tachometer generator 14 is of zero value and accordingly the control voltage developed by amplifier 18 exceeds the predetermined operating value of relay 26 which is energized to maintain the switches 80 and 92 open and thus the servomotor 20 and clutch 22 are deenergized. Accordingly, the throttle valve 24 is subject only to manual control by the accelerator pedal 28 and the driver may accelerate in any desired manner to approach the selected cruising speed. As the vehicle speed increases, the speed signal generator 14 develops an increasing output voltage thus reducing the control voltage as developed by the amplifier 18. When this control voltage reaches the operating value corresponding to a predetermined difference, for example 5 miles per hour, between the actual and desired vehicle speeds, the relay 26 is deenergized and the switches 80 and 92 are closed. Accordingly, the clutch 22 is energized to provide a driving connection between the servomotor 20 and the throttle valve 24. At the same time, the variable phase winding 84 of the servomotor 20 is energized from the amplifier 18 in accordance with the control voltage. In this condition, the reference signal voltage corresponding to the desired speed will predominate over the speed signal voltage corresponding to the actual speed and the control voltage developed by the amplifier 18 will have an amplitude and phase corresponding to this difference and, accordingly, the servomotor 20 will actuate the throttle valve 24 to reduce the control voltage to a null value. The control system will maintain the selected vehicle speed regardless of external disturbances or changes in driving conditions such as descending a hill which would tend to change the vehicle speed. In such case, the speed signal voltage from the generator 14 tends to predominate which produces a control voltage from the amplifier 18 of a corresponding phase and amplitude to energize the motor 20 in the appropriate sense to displace the throttle valve 24 and reduce the control voltage to null value. The control system, of course, responds quickly to such disturbances and there is no sensible departure of the actual speed from the desired speed. If the driver wishes to change the cruising speed, he may do so at will by operation of the appropriate push-buttons. If the newly selected speed lies outside the existing control range, the servomotor and clutch will be deenergized and manual control will be restored until the new control range of speed is attained. In the event the driver wishes to accelerate or decelerate rapidly, it is only necessary to fully depress or release the accelerator pedal 28 in accordance with his usual driving habits. This will open one of the limit switches 94 or 96 to deenergize the clutch 22 and disable the control system. Accordingly, full manual control is restored for subsequent operation of the vehicle until the driver adjusts the speed to the existing control range to reinstate the automatic control system.

Although the invention has been described with respect to a particular embodiment, such description is not to be construed in a limiting sense. Numerous modifications and variations within the spirit and scope of the invention will now occur to those skilled in the art. For a definition of the invention, reference is made to the appended claims.

We claim:

1. A speed control system for a self-propelled vehicle having a variable speed motive power means and a controller for said power means, a reference signal generator for developing a reference signal voltage corresponding to the desired speed of the vehicle, a speed signal generator for developing a speed signal voltage corresponding to the actual speed of the vehicle, combining means connected with said generators for developing a control voltage corresponding to the difference of said signal voltages, an actuator interconnected between the combining means and said controller for displacing the controller in accordance with the amplitude and sense of the control voltage thereby reducing the difference between the signal voltages to null value, and relay means connected with the combining means for disabling said actuator when the difference between the first and second signal voltages exceeds a predetermined value.

2. A speed control system for a self-propelled vehicle having a variable speed motive power means and a controller for said power means, a reference signal generator for developing a reference signal voltage corresponding to the desired speed of said vehicle, a speed signal generator for developing a speed signal voltage corresponding to the actual speed of said vehicle, combining means connected with said reference signal and said speed responsive means for developing a control voltage corresponding to the difference of said signal voltages, a power actuator interposed between said combining means and said controller for displacing the controller in accordance with said control voltage thereby reducing the difference between said first and second signal voltages to null value, a relay actuated clutch interposed between the power actuator and said controller, a manually controlled actuator connected with said controller, circuit means including a voltage source and a pair of limit switches connected with the relay actuated clutch, and means interconnecting the manually controlled actuator with the limit switches to deenergize the clutch at either limit of movement of said manually controlled actuator whereby the power actuator is ineffective to displace said controller.

3. A speed control system for a self-propelled vehicle having a variable speed motive means and a controller for said power means, a speed selector including a direct voltage source and a voltage divider circuit connected across the voltage source, said voltage divider circuit including a plurality of parallel connected resistors of different values, switching means connected with said resistors and a push-button actuated switching mechanism for selectively actuating the switching means to connect selected ones of said resistors into said voltage divider circuit for developing a reference signal voltage corresponding to the desired speed of the vehicle, a speed signal generator for developing a speed signal voltage corresponding to the actual speed of the vehicle, combining means connected with said speed signal generator and said voltage divider for developing a control voltage corresponding to the difference between the selected speed and actual speed of the vehicle, and an actuator interposed between the combining means and the controller and connected with said controller for displacement thereof in accordance with the difference of said speeds.

4. A speed control system for a self-propelled vehicle having a variable speed motive power means and a controller for said power means, a speed selector including a direct voltage source and a voltage divider circuit connected across the voltage source, said voltage divider circuit including a plurality of parallel connected resistors of different values, switching means connected with said resistors and a push-button actuated switching mechanism for selectively actuating the switching means to connect selected ones of said resistors into said voltage divider circuit for developing a reference signal voltage corresponding to the desired speed of the vehicle, a speed signal generator for developing a speed signal voltage corresponding to the actual speed of the vehicle, a converter connected with said speed signal generator and said voltage divider for developing an alternating voltage corresponding in amplitude and phase to the difference between the selected speed and actual speed of the vehicle, a phase sensitive servo amplifier connected with said converter, a reversible servomotor electrically connected with the amplifier and mechanically connected with said controller for displacement thereof in accordance with the difference of said speeds.

5. A speed control system for a self-propelled vehicle having a variable speed motive power means and a controller for said power means, a speed selector including a direct voltage source and a voltage divider circuit connected across the voltage source, said voltage divider circuit including a plurality of parallel connected resistors of different values, switching means connected with said resistors and a push-button actuated switching mechanism for selectively actuating the switching means to connect selected ones of said resistors into said voltage divider circuit for developing a reference signal voltage corresponding to the desired speed of the vehicle, a speed signal generator for developing a speed signal voltage corresponding to the actual speed of the vehicle, a converter connected with said speed signal generator and said voltage divider for developing an alternating voltage corresponding in amplitude and phase to the difference between the selected speed and actual speed of the vehicle, a phase sensitive servo amplifier connected with said converter, a reversible servomotor electrically connected with the amplifier and mechanically connected with said controller for displacement thereof in accordance with the difference of said speeds, a relay actuated clutch interposed between said servomotor and said controller, circuit means including a voltage source connected with said relay actuated clutch through a switch, and a relay connected across the output terminals of said amplifier and operatively connected with the switch for deenergizing said clutch when the difference between the selected and actual speeds exceeds a predetermined value.

6. A speed control system for a self-propelled vehicle having a variable speed motive power means and a controller for said power means, a speed selector including a direct voltage source and a voltage divider circuit connected across the voltage source, said voltage divider circuit including a plurality of parallel connected resistors of different values, switching means connected with said resistors and a push-button actuated switching mechanism for selectively actuating the switching means to connect selected ones of said resistors into said voltage divider circuit for developing a reference signal voltage corresponding to the desired speed of the vehicle, a speed signal generator for developing a speed signal voltage corresponding to the actual speed of the vehicle, a converter connected with said speed signal generator and said voltage divider for developing an alternating voltage corresponding in amplitude and phase to the difference between the selected speed and actual speed of the vehicle, a phase sensitive servo amplifier connected with said converter, a reversible servomotor electrically connected with the amplifier and mechanically connected with said controller for displacement thereof in accordance with the difference of said speeds, a relay actuated clutch interposed between said servomotor and said controller, a manually controlled actuator connected with said controller, circuit means including a voltage source and a pair of serially connected normally closed limit switches and said relay actuated clutch, and means interconnecting said manually controlled actuator with said limit switches to deenergize said clutch at either limit of movement of said manually controlled actuator whereby the servomotor is ineffective to displace said controller.

References Cited in the file of this patent
UNITED STATES PATENTS

| | | |
|---|---|---|
| 1,248,130 | Kammerhoff | Nov. 27, 1917 |
| 2,493,755 | Ferrill | Jan. 16, 1950 |
| 2,748,182 | Ericson | May 29, 1956 |
| 2,883,975 | Spetner | Apr. 28, 1959 |